United States Patent
Salgar et al.

(10) Patent No.: US 12,417,683 B2
(45) Date of Patent: Sep. 16, 2025

(54) VIDEO SURVEILLANCE SYSTEM WITH DRONE SUPPORT

(71) Applicant: HONEYWELL INTERNATIONAL INC., Charlotte, NC (US)

(72) Inventors: Mayur Sidram Salgar, Charlotte, NC (US); Indranil Datta, Charlotte, NC (US); Jitendra Sitaram Chaurasia, Charlotte, NC (US); Mourian Balasubramanian, Charlotte, NC (US); Syed Omar Khaiyam, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/658,919

(22) Filed: Apr. 12, 2022

(65) Prior Publication Data

US 2022/0335797 A1    Oct. 20, 2022

(30) Foreign Application Priority Data

Apr. 16, 2021   (IN) .............................. 202111017726

(51) Int. Cl.
*G08B 13/196*    (2006.01)
*G05D 1/00*    (2006.01)
(Continued)

(52) U.S. Cl.
CPC ....... *G08B 13/19643* (2013.01); *G05D 1/104* (2013.01); *G06N 20/00* (2019.01);
(Continued)

(58) Field of Classification Search
None
See application file for complete search history.

(56) References Cited

U.S. PATENT DOCUMENTS 8,428,391 B2    4/2013    Park
9,973,261 B1    5/2018    Hardy et al.
(Continued)

FOREIGN PATENT DOCUMENTS

CN    110858889 A    3/2020
CN    111405242 A    7/2020
(Continued)

OTHER PUBLICATIONS

Indian Office Action, Indian Patent Application No. 202111017726, India Patent Office, May 31, 2023 (7 pages).
(Continued)

*Primary Examiner* — Daniel T Tekle
(74) *Attorney, Agent, or Firm* — Seager, Tufte & Wickhem, LLP

(57) ABSTRACT

A surveillance system includes fixed video cameras and mobile security devices. Each mobile security device includes a mobile video camera, a memory, a transceiver and a controller that is configured to receive instructions from a surveillance system controller to fly to a particular location at which an incident is believed to be occurring and to instruct the mobile video camera to capture video of the incident. In some cases, the controller of the mobile security device is configured to solicit and receive one or more video streams from fixed video cameras that are determined to meet predetermined criteria with respect to the incident, and store the one or more received video streams in the memory. The controller of the mobile security device may subsequently transmit the collected video streams to the surveillance system controller.

20 Claims, 9 Drawing Sheets

(51) Int. Cl.
*G06N 20/00* (2019.01)
*G06V 10/10* (2022.01)
*G06V 20/17* (2022.01)
*G06V 20/52* (2022.01)
*H04W 4/46* (2018.01)
*B64U 101/30* (2023.01)

(52) U.S. Cl.
CPC .............. *G06V 10/16* (2022.01); *G06V 20/17* (2022.01); *G06V 20/53* (2022.01); *G08B 13/1963* (2013.01); *G08B 13/19645* (2013.01); *H04W 4/46* (2018.02); *B64U 2101/30* (2023.01); *B64U 2201/10* (2023.01)

(56) References Cited

U.S. PATENT DOCUMENTS

| | | | | |
|---|---|---|---|---|
| 11,451,980 | B2 * | 9/2022 | Silveira | H04B 7/18504 |
| 11,515,931 | B2 * | 11/2022 | Babich | H04W 16/18 |
| 2017/0322554 | A1 | 11/2017 | Lee et al. | |
| 2018/0184051 | A1 * | 6/2018 | Watanabe | G08B 13/19602 |
| 2020/0043235 | A1 * | 2/2020 | Chapman | G06T 19/006 |
| 2020/0051438 | A1 * | 2/2020 | Magdaleno | G05D 1/104 |
| 2022/0262121 | A1 * | 8/2022 | Iqbal | G06V 40/20 |

FOREIGN PATENT DOCUMENTS

| | | | |
|---|---|---|---|
| EP | 3128748 | A1 | 2/2017 |
| KR | 101637972 | B1 | 7/2016 |
| KR | 20180025416 | A | 3/2018 |
| WO | 2017030737 | A1 | 2/2017 |
| WO | 2018084726 | A1 | 5/2018 |
| WO | WO218084726 | * 11/2018 | ............. H04N 5/232 |

OTHER PUBLICATIONS

Wang, X., et al., "Networked Drone Cameras for Sports Streaming," 2017 IEEE 37th International Conference on Distributed Computing Systems, Princeton University, Princeton, NJ Jun. 5, 2017, pp. 308-318, XP033122990, ISSN:1063-6927, DOI: 10.1109/ICDCS.2017.200.

Extended European Search Report, EP Application No. 22166520.1, European Patent Office, Aug. 4, 2022 (11 pages).

Liew et al; Recent Developments in Aerial Robotics: A Survey and Prototypes Overview, vol. 2, pp. 1-14, 2017.

https://www.aspentech.com/en/blog, Jul. 16, 2020.

Vergouw et al; "Drone Technology: Types, Payloads, Applications, Frequency Spectrum Issues and Future Developments," Chapter 2, 29 pages, 2016.

First Office Action, CN Application No. 202210387006.3, National Intellectual Property Administration, P. R. China, Jan. 12, 2025 (translation provided) (36 pages).

* cited by examiner

VIDEO SURVEILLANCE SYSTEM WITH DRONE SUPPORT

CROSS-REFERENCE TO RELATED APPLICATIONS

This application claims priority pursuant to 35 U.S.C. 119(a) to India Patent Application No. 202111017726, filed Apr. 16, 2021, which application is incorporated herein by reference in its entirety.

TECHNICAL FIELD

The present disclosure relates generally to video surveillance systems. More particularly, the present disclosure relates to video surveillance systems that combine fixed video cameras with mobile video cameras each affixed to a mobile platform such as a drone.

BACKGROUND

A number of video surveillance systems employ video cameras that are installed or otherwise arranged around a surveillance area such as a city, a portion of a city, a facility or a building. While these video surveillance systems may employ hundreds or even thousands of video cameras, there may be circumstances under which a possible incident may occur in a location that is not covered or at least is not well-covered by the installed video cameras. For example, in some cases, there may be gaps in coverage between the installed video cameras. In some cases, an incident may be obscured by a truck or bus. An overgrown tree may interfere with the field of view of a particular video camera. The video camera best positioned to view a possible incident may be temporarily out of service due to maintenance needs. These are just examples. What would be desirable are methods and systems for using mobile video cameras, such as those mounted to drones, to supplement the video coverage provided by a video surveillance system that has video cameras installed at fixed locations.

SUMMARY

The present disclosure relates to video surveillance systems. In an example, a video surveillance system includes a surveillance system controller, and a plurality of fixed video cameras that are installed at fixed locations within a surveillance area. Each of the plurality of fixed video cameras are configured to capture and store a video stream corresponding to a field of view of the particular fixed video camera. The illustrative surveillance system also includes a plurality of mobile security devices that are configured to fly, such as a drone. Each of the plurality of mobile security devices includes a mobile video camera carried by the mobile security device, a memory, a transceiver and a controller. The controller is operably coupled to the mobile video camera, the memory and the transceiver. The controller of each of the plurality of mobile security devices is configured to receive instructions from the surveillance system controller to fly to a particular location at which an incident is believed to be occurring and to instruct the mobile video camera to capture video of the incident. The controller of each of the plurality of mobile security devices is further configured to determine which of the plurality of fixed video cameras meet predetermined criteria with respect to the incident. In some cases, the predetermined criteria include the fixed location of the fixed video cameras relative to the incident. In one example, the predetermined criteria may identify which of the plurality of fixed video cameras are within 2 blocks of the incident. The controller of each of the plurality of mobile security devices may also be configured to solicit and receive via the transceiver one or more video streams from the one or more of the plurality of fixed video cameras that are determined to meet the predetermined criteria with respect to the incident, and store the one or more received video streams in the memory and to provide the video captured by the mobile video camera and at least one of the video streams from the one or more of the plurality of fixed video cameras that are determined to meet the predetermined criteria with respect to the incident to the surveillance system controller.

In another example, a method of maintaining video surveillance of a surveillance area is provided. The surveillance area includes a plurality of installed cameras and a surveillance controller to which the plurality of installed cameras are operably coupled. Each of the plurality of installed cameras has a field of view within the surveillance area. The method includes the surveillance controller receiving an indication of a possible incident in a vicinity of one of the plurality of installed video cameras, and in response, requesting that a drone overfly the possible incident. In response to receiving the request, a drone flies towards the possible incident. The drone communicates with one or more of the plurality of installed video cameras in order to obtain video footage that was obtained by the one or more of the plurality of installed video cameras. The drone also capturing live video of the possible incident. The drone communicates the live video and optionally communicating the video footage obtained from one or more of the plurality of installed video cameras to the surveillance controller.

In another example, a drone is configured for use in a surveillance system that includes a plurality of video cameras that are installed at fixed locations. The drone includes a video camera, a memory, a cellular transceiver and a controller that is operably coupled to the video camera, the memory and the cellular transceiver. The controller is configured to receive instructions to fly to a particular location at which an incident is believed to be occurring and to capture video of the incident using the video camera. The controller of the drone is configured to solicit one or more captured video streams from one or more of the plurality of video cameras and to transmit the video captured by the video camera and at least one of the solicited video streams from one or more of the plurality of video cameras.

In another example, a method for monitoring a surveillance area includes automatically detecting an incident at a location in the surveillance area by processing a video captured by one or more fixed video cameras in the surveillance area. In response to the detected incident, a surveillance drone is automatically dispatched to the incident without human input. Video of the incident is automatically captured using a video camera of the surveillance drone. The surveillance drone is automatically moved to track the incident as the incident moves.

In another example, a method for monitoring a surveillance area includes generating a schedule of time and location that is based at least in part on a history of incidents that were detected in the surveillance area using machine learning. A surveillance drone is then automatically dispatched according to the schedule. The schedule may be automatically updated using machine learning based on subsequent incidents that are detected in the surveillance area.

In another example, a method for monitoring a surveillance area includes automatically detecting an incident in the surveillance area by processing a video captured by one or more fixed video cameras in the surveillance area and generating an incident signature for the incident that is based at least in part on the video captured by one or more fixed video cameras in the surveillance area. In response to the detected incident, a surveillance drone is dispatched to the incident and the incident signature is provided to the drone, sometime automatically. The drone identifies the incident based at least in part on the incident signature. Video of the incident is then automatically captured using a video camera of the surveillance drone. The drone is automatically moved to track the incident.

In another example, a surveillance system is configured to provide surveillance of a surveillance area. The surveillance system includes a plurality of fixed video cameras that are installed at fixed locations within the surveillance area, each of the plurality of fixed video cameras configured to capture a video stream corresponding to a field of view of the particular fixed video camera. The surveillance system also includes one or more drones that are configured to supplement surveillance of the surveillance area, wherein at least some of the one or more drones and at least some of the plurality of fixed video cameras sharing information via a mesh network.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
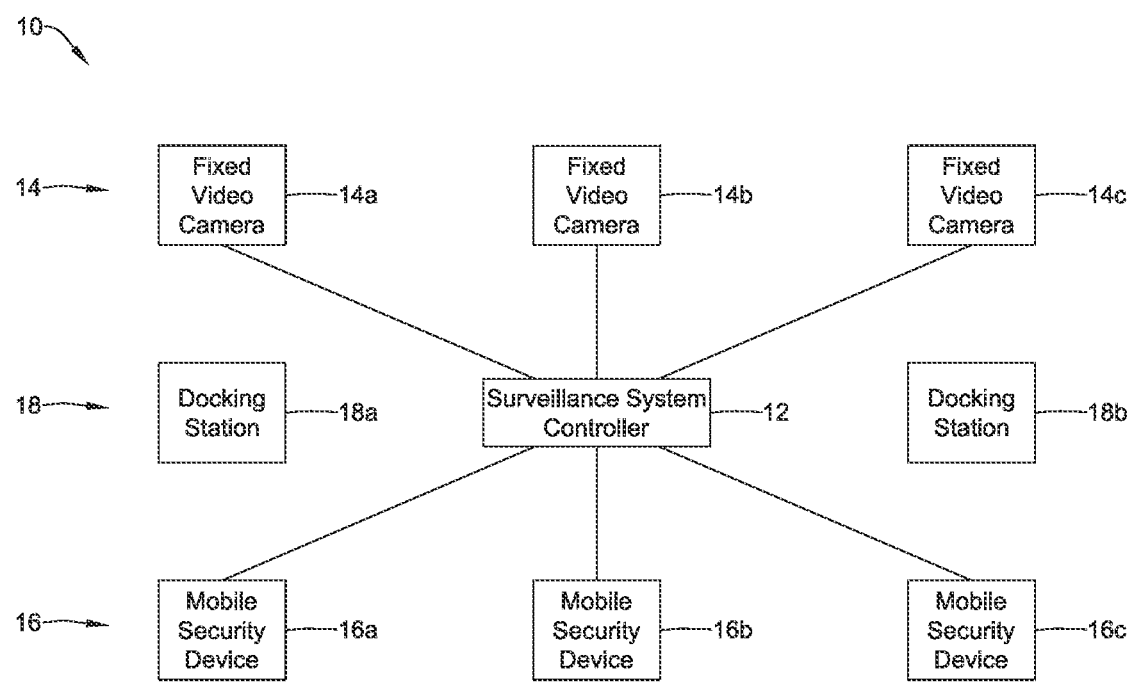
FIG. 1 is a schematic block diagram of an illustrative surveillance system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DETAILED DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative surveillance system 10 that is configured to provide surveillance of a surveillance area. The illustrative surveillance system 10 includes a surveillance system controller 12 and a plurality of fixed video cameras 14 that are installed at fixed locations within the surveillance area. The fixed video cameras 14 are individually labeled as 14a, 14b, 14c. While a total of three fixed video cameras 14 are illustrated, it will be appreciated that the surveillance system 10 may include hundreds or even thousands of fixed video cameras 14 that are installed at fixed locations throughout a smart city, for example. Some of the fixed video cameras 14 may have a fixed field of view that is dictated by where and how the cameras are installed, the lens installed on the camera, and so on. Some of the fixed video cameras 14 may have a field of view that is adjustable. For example, some of the fixed video cameras 14 may be Pan, Tilt and Zoom (PTZ) cameras that can adjust their field of view by adjusting one or more of the Pan, the Tilt and the Zoom of the particular video cameras 14.

The illustrative surveillance system 10 further includes a plurality of mobile security devices 16 that are configured to move about within the surveillance area. The mobile security devices 16 are individually labeled as 16a, 16b, 16c. While a total of three mobile security devices 16 are illustrated, it will be appreciated that the illustrative surveillance system 10 may include hundreds or even thousands of mobile security devices 16. In some cases, at least some of the plurality of mobile security devices 16 may be configured to fly. In some cases, at least some of the plurality of mobile security devices 16 may be unmanned aerial surveillance devices. At least some of the plurality of mobile security devices 16 may be drones.

The illustrative surveillance system 10 includes docking stations 18, individually labeled as 18a and 18b. While a total of two docking stations 18 are illustrated, it will be appreciated that the surveillance system 10 may include less or a substantially greater number of docking stations 18 that are disposed around the surveillance area, or even disposed around a smart city. The docking stations 18 may be configured to recharge the mobile security devices 16, for example, as well as providing a secure base for the mobile security devices 16 when not in active use. In some cases, there may be more mobile security devices 16 within the surveillance area than there are docking stations 18. Accordingly, the mobile security devices 16 may communicate with each other, sometimes via a mesh network, in order to determine which mobile security devices 16 are able to utilize a particular docking station 18 and when. The mobile security devices 16 may work together to prioritize use of the docking stations 18, sometime based on remaining battery life, current and/or expected future location and/or current mission. In some cases, the surveillance system controller 12 may communicate with the mobile security devices 16 to receive their power needs, and the surveillance system controller 12 itself may determine how to prioritize use of the docking stations 18 amongst the mobile security devices 16.

Figure 2:
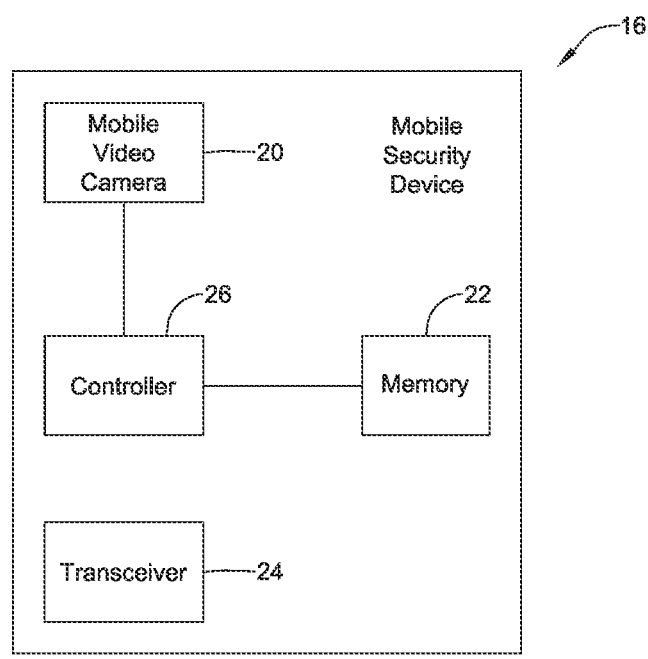
FIG. 2 is a schematic block diagram of an illustrative mobile security device usable in the illustrative surveillance system of FIG. 1.

FIG. 2 is a schematic block diagram of one of the mobile security devices 16 of FIG. 1. The mobile security device 16 shown in FIG. 2 includes a mobile video camera 20 that is carried by the mobile security device 16. The mobile security device 16 also includes a memory 22, a transceiver 24, and a controller 26 that is operably coupled to the mobile video camera 20, the memory 22 and the transceiver 24. The memory 22 may configured to store navigation maps for the mobile security device 16. The memory 22 may be configured to store video clips that are captured by the mobile video camera 20 and/or received by the mobile security device 16 via the transceiver 24. The transceiver 24 may operate using any desired wireless protocol. In some cases, the transceiver 24 may be a cellular transceiver. In some cases, the transceiver 24 may be a 5G (fifth generation) cellular transceiver having substantial bandwidth capability.

Figure 3:
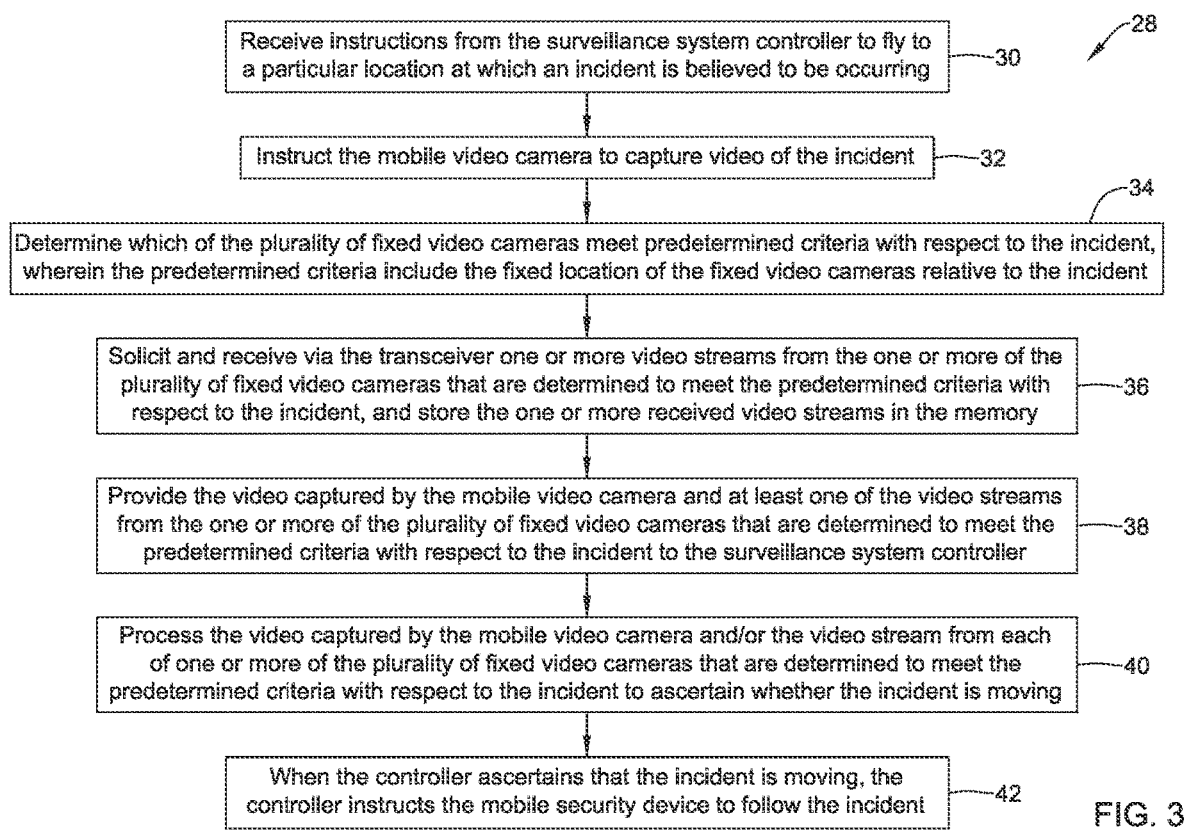
FIG. 3 is a flow diagram showing an illustrative method that the illustrative mobile security device of FIG. 2 may be configured to carry out.

FIG. 3 is a flow diagram showing an illustrative method 28 that the controller 26 of the mobile security device 16 of FIG. 2 may be configured to carry out. The controller 26 of the mobile security device may be configured to receive instructions from the surveillance system controller 12 of FIG. 1 to move (e.g. fly or drive) the mobile security device 16 to a particular location at which an incident is believed to be occurring, as indicated at block 30. The controller 26 of the mobile security device 16 may be configured to instruct the mobile video camera 20 to capture video of the incident, as indicated at block 32. The controller 26 of the mobile security device 16 may be configured to determine which of the plurality of fixed video cameras 14 of FIG. 1 meet predetermined criteria with respect to the incident. In some cases, the predetermined criteria include the fixed location of the fixed video cameras 14 relative to the incident, as indicated at block 34. In one example, the predetermined criteria may identify which of the fixed video cameras 14 are within 2 blocks of the incident. The controller 26 of the mobile security device 16 may then be configured to solicit and receive via the transceiver 24 one or more video streams from the one or more of the plurality of fixed video cameras 14 that are determined to meet the predetermined criteria with respect to the incident, and store the one or more received video streams in the memory 22, as indicated at block 36. The controller 26 of the mobile security device 16 may be configured to provide the video captured by the mobile video camera 20 and at least one of the video streams from the one or more of the plurality of fixed video cameras 14 that are determined to meet the predetermined criteria with respect to the incident to the surveillance system controller 12, as indicated at block 38.

In some cases, the controller 26 of the mobile security device 16 may be configured to process the video captured by the mobile video camera 20 and/or the video stream from each of one or more of the plurality of fixed video cameras 14 that are determined to meet the predetermined criteria with respect to the incident to ascertain whether the incident is moving, as indicated at block 40. When the controller ascertains that the incident is moving, the controller may instruct the mobile security device 16 to follow the incident, as indicated at block 42. When the mobile security device 16 is moving to follow the incident, the controller 26 may update which of the plurality of fixed video cameras 14 meet the predetermined criteria with respect to the incident, and solicit and receive via the transceiver 24 one or more video streams from one or more of the updated plurality of fixed video cameras 14 that meet the predetermined criteria with respect to the incident.

In some cases, the controller 26 may be configured to determine whether any of the plurality of fixed video cameras 14 that are determined to meet the predetermined criteria with respect to the incident have an adjustable field of view. The controller 26 of the mobile security device 16 may be configured to determine adjustment instructions for at least one of the fixed video cameras 14 that are determined to have an adjustable field of view, and to transmit via the transceiver 24 the adjustment instructions. In some cases, at least some of the video cameras 14 having an adjustable field of view include Pan Tilt Zoom (PTZ) cameras, and the adjustment instructions include instructing the PTZ cameras to change one or more of their Pan, their Tilt and their Zoom to follow the incident.

In some cases, the controller 26 of the mobile security device 16 may be configured to receive an instruction from the surveillance system controller 12 instructing the mobile security device 16 to fly to a particular location in order to provide additional surveillance. For example, the surveillance system controller 12 (see FIG. 1) may be configured to instruct one or more mobile surveillance devices 16 to fly to the particular location to monitor a crowd of people gathered at the particular location. The surveillance system controller 12 may be configured to instruct one or more mobile surveillance devices 16 to fly to the location in order to provide video in place of a video stream from one or more of the plurality of fixed video cameras 14 that is currently not functioning or under maintenance. In some cases, the surveillance system controller 12 may be configured to utilize machine learning to learn when and where to instruct one or more of the plurality of mobile security devices 16 to fly to one or more particular locations. In some cases, the controller 26 may be configured to stitch together two or more video streams to form a stitched video, and to provide the stitched video to the surveillance system controller 12.

Figure 4:
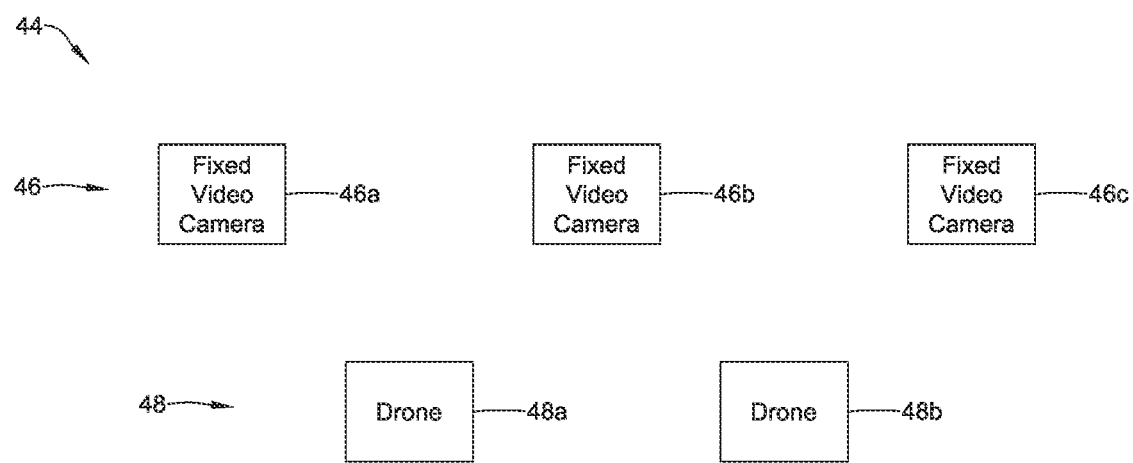
FIG. 4 is a schematic block diagram of an illustrative surveillance system.

FIG. 4 is a schematic block diagram of an illustrative surveillance system 44 that is configured to provide surveillance of a surveillance area. The illustrative surveillance system 44 may be considered as being an example of the surveillance system 10. Features and functionality of various parts of the surveillance system 10 may be considered as being provided as part of the surveillance system 44. Similarly, features and functionality of various parts of the surveillance system 44 may be considered as being provided as part of the surveillance system 10. The illustrative surveillance system 44 includes a plurality of fixed video cameras 46 that are installed at fixed locations within the surveillance area. The fixed video cameras 46 are individually labeled as 46a, 46b, 46c. While a total of three fixed video cameras 46 are illustrated, it will be appreciated that the surveillance system 44 may include hundreds or even thousands of fixed video cameras 46 that are installed at locations throughout a smart city, a portion of a smart city, a facility or a building, for example. Each of the plurality of fixed video cameras 46 may be configured to capture a video stream corresponding to a field of view of the particular fixed video camera 46.

Some of the fixed video cameras 46 may have a fixed field of view that is dictated by where and how the cameras are installed, the lens installed on the camera, and so on. Some of the fixed video cameras 46 may have a field of view that is adjustable. For example, some of the fixed video cameras 46 may be Pan, Tilt and Zoom (PTZ) cameras that can adjust their field of view by adjusting one or more of the Pan, the Tilt and the Zoom of the particular video cameras 46.

The illustrative surveillance system 44 includes a plurality of drones 48 that are configured to move about within the surveillance area. The drones 48 are individually labeled as 48a, 48b. While a total of two drones 48 are illustrated, it will be appreciated that the surveillance system 44 may include fewer or hundreds or even thousands of drones 48. At least some of the drones 48, and in some cases at least some of the fixed video cameras 46, are configured to share information via a mesh network that is formed using at least some of the fixed video cameras 46 and/or at least some of the drones 48 as nodes within the mesh network. In some cases, the information that is shared via the mesh network includes one or more video streams. In some cases, the information that is shared via the mesh network include metadata that is derived from one or more video streams. The information that is shared via the mesh network may also include location information. The information that is shared via the mesh network may also include device identifier information. The information that is shared via the mesh network may include an incident signature that can be used to identify an incident in a video stream. These are just examples.

Figure 5:
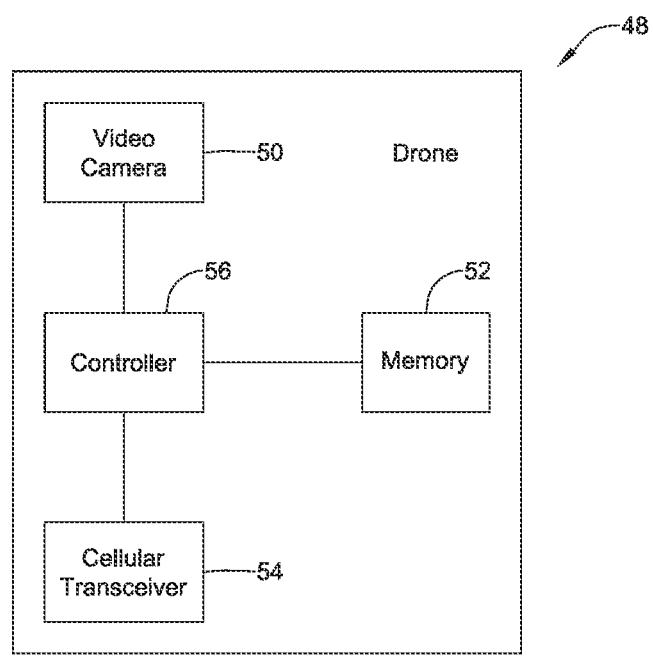
FIG. 5 is a schematic block diagram of an illustrative drone usable in the illustrative surveillance system of FIG. 4.

FIG. 5 is a schematic block diagram of an illustrative drone 48 that is configured for use in a surveillance system such as the surveillance system 10 or the surveillance system 44 that includes a plurality of video cameras that are installed at fixed locations, such as the fixed video cameras 14 and/or the fixed video cameras 46. The illustrative drone 48 includes a video camera 50, a memory 52, a cellular transceiver 54, and a controller 56 that is operably coupled to the video camera 50, the memory 52 and the cellular transceiver 54. The controller 56 may be considered as including any and all of the functionality ascribed to the controller 26 of the mobile security device of FIG. 2. Among other features, the controller 56 may be configured to receive instructions to fly to a particular location at which an incident is believed to be occurring and to capture video of the incident using the video camera 50. The controller 56 may be considered as being configured to solicit one or more captured video streams from one or more of the plurality of video cameras 14, 46 and to transmit the video captured by the video camera 50 and at least one of the solicited video streams from one or more of the plurality of video cameras 14, 46.

Figure 6:
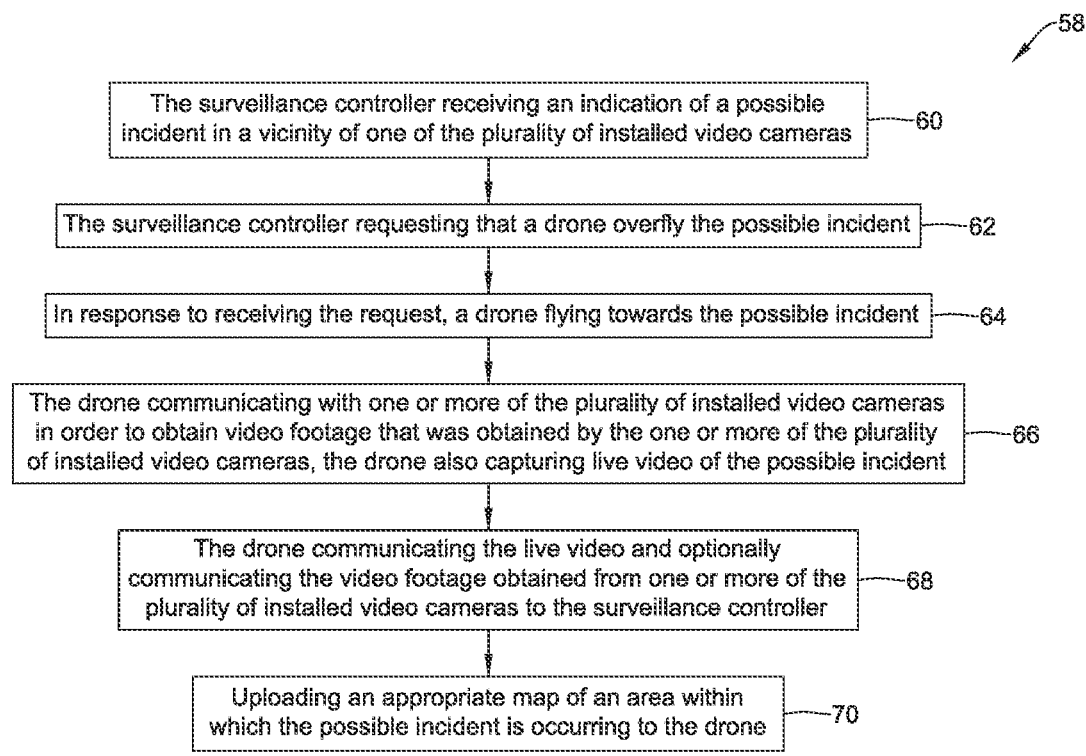
FIG. 6 is a flow diagram showing an illustrative method.

FIG. 6 is a flow diagram showing an illustrative method 58 of maintaining video surveillance of a surveillance area that includes a plurality of installed video cameras (such as the fixed video cameras 14, 46), and a surveillance controller (such as the surveillance system controller 12) to which the plurality of installed video cameras are operably coupled, each of the plurality of installed video cameras having a field of view within the surveillance area. The illustrative method 58 includes the surveillance controller receiving an indication of a possible incident in a vicinity of one of the plurality of installed video cameras, as indicated at block 60. The surveillance controller requests that a drone overfly the possible incident, as indicated at block 62. In response to receiving the request, a drone flies towards the possible incident, as indicated at block 64. The drone communicates with one or more of the plurality of installed video cameras in order to obtain video footage that was obtained by the one or more of the plurality of installed video cameras, the drone also capturing live video of the possible incident, as indicated at block 66. The drone communicates the live video and optionally communicating the video footage obtained from one or more of the plurality of installed video cameras to the surveillance controller, as indicated at block 68. In some cases, the method 58 may further include uploading an appropriate map of an area within which the possible incident is occurring to the drone.

In some cases, the drone communicates with one or more of the plurality of installed video cameras in order to obtain archived video footage as well as live video footage. The drone may be configured to receive subsequent navigational instructions from a surveillance controller. The drone may be configured to receive an incident signature, and to use the incident signature to identify the incident in the drone's captured video and subsequently track the incident over time.

Figure 7:
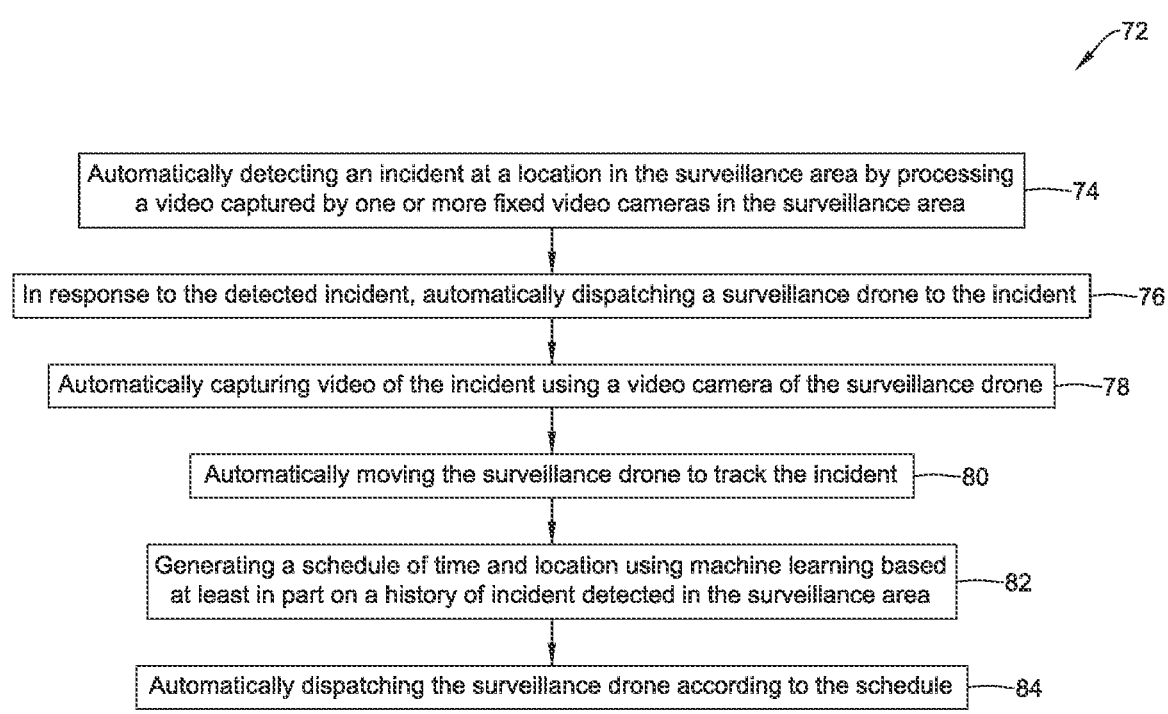
FIG. 7 is a flow diagram showing an illustrative method.

FIG. 7 is a flow diagram showing an illustrative method 72 for monitoring a surveillance area. The method 72 includes automatically detecting an incident at a location in the surveillance area by processing a video captured by one or more fixed video cameras in the surveillance area, as indicated at block 74. In response to the detected incident, a surveillance drone is dispatched to the incident as indicated at block 76, sometimes automatically without human input. Video of the incident is automatically captured using a video camera of the surveillance drone, as indicated at block 78. The surveillance drone may then be automatically moved to track the incident, as indicated at block 80.

In some cases, the method 72 further includes generating a schedule of time and location using machine learning based at least in part on a history of incident detected in the surveillance area, as indicated at block 82. The surveillance drone is automatically dispatched according to the schedule, as indicated at block 84. In some cases, the schedule may be automatically updated using machine learning based on subsequent incidents that are detected in the surveillance area. In some cases, the schedule may also be based at least in part on a maintenance schedule of the fixed video cameras.

Figure 8:
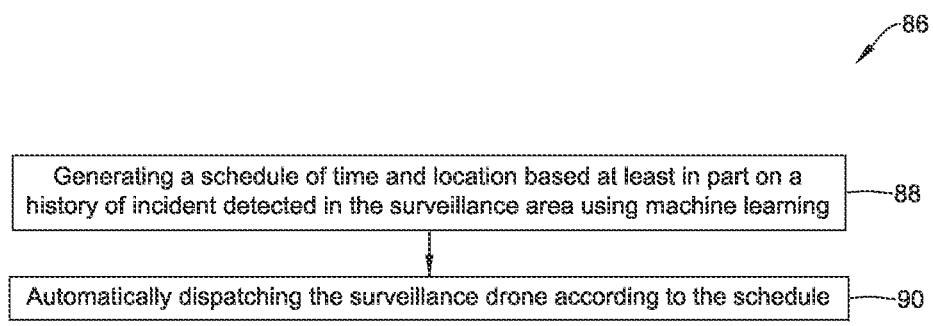
FIG. 8 is a flow diagram showing an illustrative method.

FIG. 8 is a flow diagram showing an illustrative method 86 for monitoring a surveillance area. A schedule of time and location is generated based at least in part on a history of incidents detected in the surveillance area using machine learning, as indicated at block 88. A surveillance drone is automatically dispatched according to the schedule, as indicated at block 90. For example, machine learning may provide an indication that a large crowd tends to gather at a particular location every Friday night. One or more surveillance drones may be automatically dispatched to that particular location at a particular time every Friday night. The schedule may be automatically updated using machine learning based on subsequent incidents that are detected in the surveillance area.

Figure 9:
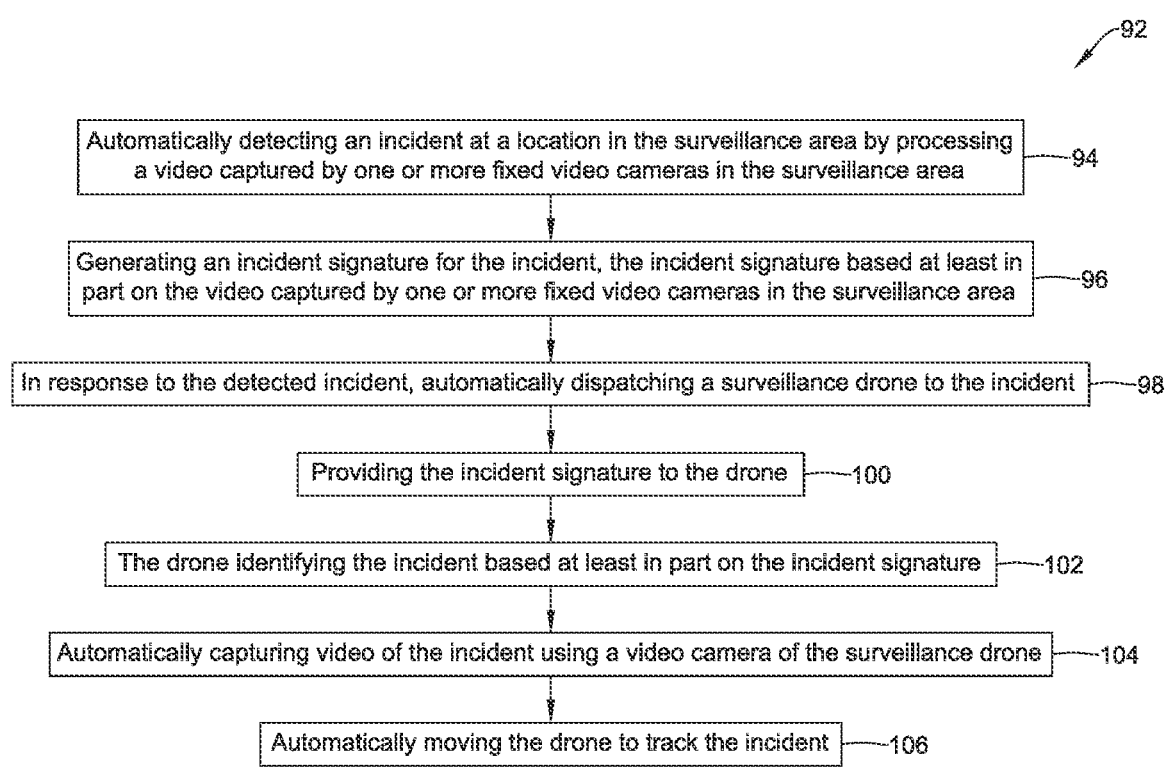
FIG. 9 is a flow diagram showing an illustrative method.

FIG. 9 is flow diagram showing an illustrative method 92 for monitoring a surveillance area. An incident is automatically detected in the surveillance area by processing a video that was captured by one or more fixed video cameras in the surveillance area, as indicated at block 94. An incident signature is generated for the incident. The incident signature is based at least in part on the video captured by the one or more fixed video cameras in the surveillance area, as indicated at block 96. In response to the detected incident, and as indicated at block 98, a surveillance drone is automatically dispatched to the incident. The incident signature is provided to the surveillance drone, as indicated at block 100. The surveillance drone may identify the incident based at least in part on the incident signature, as indicated at block 102. Video of the incident is then automatically captured using a video camera of the surveillance drone, as indicated at block 104. The surveillance drone is automatically moved to track the incident, as indicated at block 106.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed:

1. A surveillance system configured to provide surveillance of a surveillance area, the surveillance system comprising:
    a surveillance system controller;
    a plurality of fixed video cameras installed at fixed locations within the surveillance area, each of the plurality of fixed video cameras configured to capture and store a video stream corresponding to a field of view of the particular fixed video camera;
    a plurality of mobile security devices that are configured to fly, each of the plurality of mobile security devices comprises:
        a mobile video camera carried by the mobile security device;
        a memory carried by the mobile security device;
        a transceiver carried by the mobile security device;
        a controller carried by the mobile security device, the controller operably coupled to the mobile video camera of the mobile security device, the memory of the mobile security device and the transceiver of the mobile security device, wherein:
            the controller of the mobile security device is configured to receive instructions from the surveillance system controller to fly to a particular location at which an incident is believed to be occurring;
            the controller of the mobile security device is configured to instruct the mobile video camera of the mobile security device to capture video of the incident;
            the controller of the mobile security device is configured to determine which of the plurality of fixed video cameras meet predetermined criteria with respect to the incident, wherein the predetermined criteria include the fixed location of the fixed video cameras relative to the incident;
            the controller of the mobile security device is configured to solicit and receive via the transceiver of the mobile security device one or more video streams from the one or more of the plurality of fixed video cameras that are determined by the controller of the mobile security device to meet the predetermined criteria with respect to the incident, and store the one or more received video streams in the memory of the mobile security device; and
            the controller of the mobile security device is configured to provide the video captured by the mobile video camera of the mobile security device and at least one of the video streams from the one or more of the plurality of fixed video cameras that are determined by the controller of the mobile security device to meet the predetermined criteria with respect to the incident to the surveillance system controller.

2. The surveillance system of claim 1, wherein the controller of each of the plurality of mobile security devices is further configured to:
    process the video captured by the mobile video camera and/or the video stream from each of one or more of the plurality of fixed video cameras that are determined by the controller of the respective mobile security device to meet the predetermined criteria with respect to the incident to ascertain whether the incident is moving; and
    when the controller of the respective mobile security device ascertains that the incident is moving, the controller instructs the respective mobile security device to follow the incident.

3. The surveillance system of claim 2, wherein when the respective mobile security device is moving to follow the incident, the controller of the respective mobile security device updates which of the plurality of fixed video cameras meet the predetermined criteria with respect to the incident, and solicits and receives via the transceiver of the respective mobile security device one or more video streams from one or more of the updated plurality of fixed video cameras that meet the predetermined criteria with respect to the incident.

4. The surveillance system of claim 3, wherein the controller of the respective mobile security device is further configured to determine whether any of the plurality of fixed video cameras that are determined to meet the predetermined criteria with respect to the incident have an adjustable field of view.

5. The surveillance system of claim 4, wherein the controller of the respective mobile security device is further configured to determine adjustment instructions for at least one of the fixed video cameras that are determined to have an adjustable field of view, and to transmit via the transceiver the adjustment instructions.

6. The surveillance system of claim 5, wherein at least some of the video cameras having an adjustable field of view comprise Pan Tilt Zoom (PTZ) cameras, and the adjustment instructions include instructing the PTZ cameras to change one or more of their Pan, their Tilt and their Zoom to follow the incident.

7. The surveillance system of claim 1, wherein the controller of each of the plurality of mobile security devices is further configured to receive an instruction from the surveillance system controller instructing the respective mobile security device to fly to a particular location in order to provide additional surveillance.

8. The surveillance system of claim 7, wherein the surveillance system controller is configured to instruct one or more mobile surveillance devices to fly to the particular location to monitor a crowd of people gathered at the particular location.

9. The surveillance system of claim 7, wherein the surveillance system controller is configured to instruct one or more mobile surveillance devices to fly to the location in order to provide video in place of a video stream from one or more of the plurality of fixed video cameras that is currently not functioning.

10. The surveillance system of claim 7, wherein the surveillance system controller is configured to utilize machine learning to learn when and where to instruct one or more of the plurality of mobile security devices to fly to one or more particular locations.

11. The surveillance system of claim 1, wherein the controller of each of the plurality of mobile security devices is further configured to stitch together two or more video streams to form a stitched video, and to provide the stitched video to the surveillance system controller.

12. The surveillance system of claim 1, further comprising a plurality of docking stations each installed at a location, and the plurality of mobile security devices are configured to communicate with each other in order to determine which of the plurality of mobile security devices utilize which of the plurality of docking stations and when.

13. The surveillance system of claim 1, wherein the transceiver of the mobile security device comprises a cellular 5G transceiver.

14. The surveillance system of claim 1, wherein at least some of the plurality of mobile security devices comprise unmanned aerial surveillance devices.

15. A method of maintaining video surveillance of a surveillance area, the surveillance area including a plurality of installed video cameras, and a surveillance controller to which the plurality of installed video cameras are operably coupled, each of the plurality of installed video cameras having a field of view within the surveillance area, the method comprising:
the surveillance controller receiving an indication of a possible incident in a vicinity of one of the plurality of installed video cameras;
the surveillance controller requesting that a drone overfly the possible incident;
in response to receiving the request, a drone flying towards the possible incident;
the drone communicating with one or more of the plurality of installed video cameras and obtaining video footage that was captured by the one or more of the plurality of installed video cameras and storing the video footage obtained from one or more of the plurality of installed video cameras in a memory of the drone, the drone also capturing live video of the possible incident via a video camera of the drone and storing the live video in the memory of the drone; and
the drone communicating the live video and optionally communicating the video footage obtained from one or more of the plurality of installed video cameras to the surveillance controller.

16. The method of claim 15, further comprising uploading an appropriate map of an area within which the possible incident is occurring to the drone.

17. The method of claim 15, wherein the drone communicates with one or more of the plurality of installed video cameras in order to obtain archived video footage as well as live video footage.

18. The method of claim 15, wherein the drone is configured to receive subsequent navigational instructions from the surveillance controller.

19. The method of claim 15, wherein the drone is configured to receive an incident signature, and wherein the drone uses the incident signature to identify the incident in the drone's captured video and track the incident over time.

20. A drone configured for use in a surveillance system that includes a plurality of video cameras installed at fixed locations, the drone comprising:
a video camera carried by the drone;
a memory carried by the drone;
a cellular transceiver carried by the drone;
a controller carried by the drone, the controller operably coupled to the video camera of the drone, the memory of the drone and the cellular transceiver of the drone, the controller of the drone configured to:
receive instructions to fly to a particular location at which an incident is believed to be occurring;
capture video of the incident using the video camera of the drone;
solicit and receive via the cellular transceiver of the drone one or more captured video streams from one or more of the plurality of video cameras, and store the one or more received video streams from one or more of the plurality of video cameras in the memory of the drone; and
transmit the video captured by the video camera of the drone and at least one of the solicited video streams from one or more of the plurality of video cameras.

\* \* \* \* \*